W. H. WILLIAMS.
PLOW.
APPLICATION FILED DEC. 27, 1911.
1,036,395.
Patented Aug. 20, 1912.
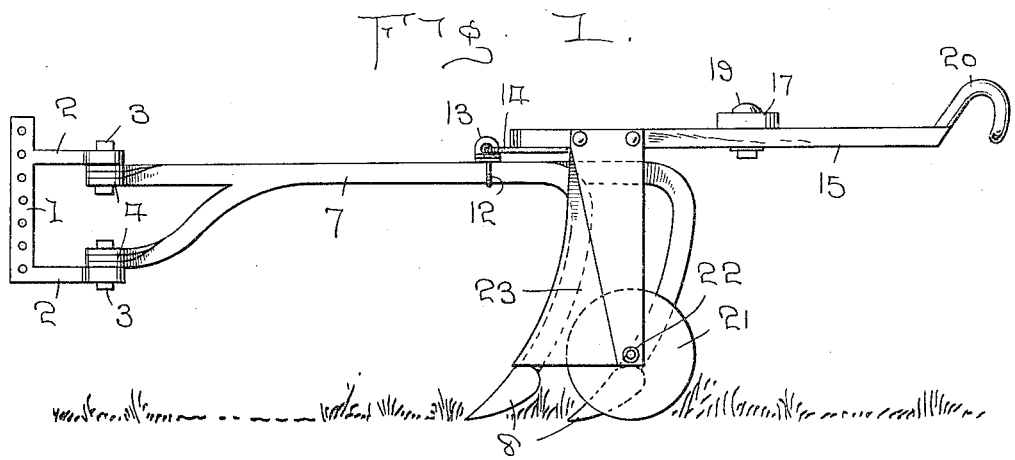
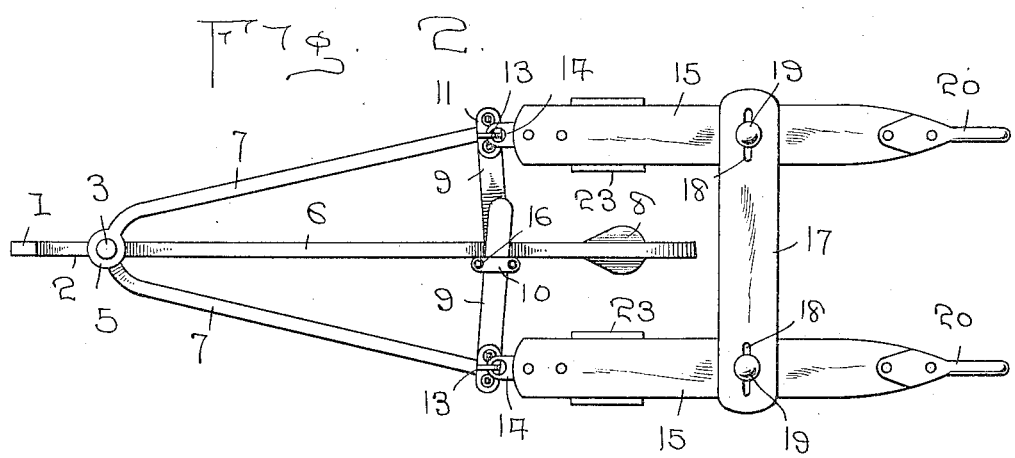
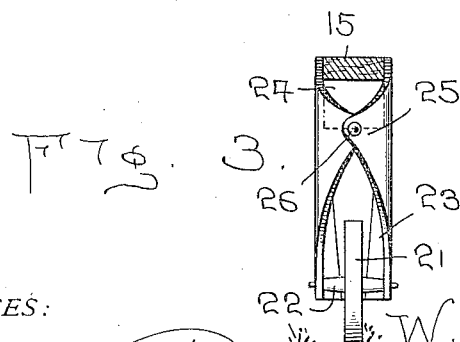
WITNESSES:
INVENTOR
W. H. Williams
BY
Attorneys

UNITED STATES PATENT OFFICE.

WILLIAM HENRY WILLIAMS, OF STATESBORO, GEORGIA.

PLOW.

1,036,395.     Specification of Letters Patent.     Patented Aug. 20, 1912.

Application filed December 27, 1911. Serial No. 668,106.

*To all whom it may concern:*

Be it known that I, WILLIAM H. WILLIAMS, a citizen of the United States, residing at Statesboro, in the county of Bulloch and State of Georgia, have invented certain new and useful Improvements in Plows; and I do hereby declare the following to be a full, clear, and exact description of the invention, such as will enable others skilled in the art to which it appertains to make and use the same.

This invention relates to farming implements and more particularly to plows.

An object of the invention is to provide a plow having a central beam and side beams pivotally connected at their front ends and carrying implements upon their downwardly curved rear ends, and adjustable means connected near the rear ends of the beams to support wheels for guiding the beams and supporting the implements and handles connected with the wheel supporting means.

Another object is to provide a plow which may be adjusted at various angles and means for supporting the implements and guiding the same.

Other objects and advantages will be hereinafter set forth in the specification and claims.

In the accompanying drawings which are made a part of this application, Figure 1 is a side elevation of the complete plow, Fig. 2, is a top plan view, and, Fig. 3 is a detail view of the wheel supporting and housing member, showing the same attached to one of the handles and the wheel mounted in the lower rear corner of said wheel supporting and housing member.

Referring more particularly to the drawings in which similar reference numerals designate corresponding parts throughout the several views, 1 indicates the clevis having the parallel rearwardly directed arms 2 carrying vertically extending bolts 3 in their free ends, upon which bolts are secured the extremities of the forked forward ends 4 and 5 of the central beam 6 and side beams 7 respectively. The central beam 6 has its forward end in alinement with its main portion while the forward ends of the side beams 7 are curved at an angle to the main portions of said side beams. The rear end of each beam, however, is curved downwardly to form a stock 7ª and has a plowing or cultivating implement 8 secured upon its lower end in any well known manner. The central beam 6 is preferably of greater length than the side beams 7, thereby placing the implement carried by said central beam rearwardly of as well as between the implements carried by the side beams 7. The side beams 7 are connected, near their rear ends to the central beam 6 by means of the adjusting arms 9, one end of each arm 9 being secured to a side beam 7 while its opposite end is passed beneath the strap 10 carried by the central beam 6, the free ends of the arms 9 overlapping each other. The outer end of each arm 9 is secured to one of the side beams 7 by which it is carried, by means of the plate 11, secured to the beam 7 by a suitable staple 12 or other fastening means and carrying an upwardly directed perforated ear 13 movably engaging with the forward end 14 of one of the flat handle-bars 15. The strap 10 may be secured to the central beam 6 in any proper manner such as by the adjusting screws 16 and together therewith constituting an adjusting clamp by which said strap may be tightened over the overlapping arms 9 for clamping them together in adjusted relation. The flat handle-bars 15 project rearwardly and are secured in parallel relation to one another by means of the cross brace 17 having slots 18 near its opposite ends, extending longitudinally of the cross brace, said brace being secured to the handle-bars 15 by means of bolts 19 through said slots 18 and through the handles 15. The cross brace 17 is preferably located about midway the ends of the handle-bars 15 and it will therefore be seen that said handle-bars may be readily adjusted and secured in parallel relation to one another after such parallel relation has been destroyed by adjustment of the members 9. Any suitable form of hand holds, such as shown at 20 may be secured to the reduced free rear ends of the handle-bars 15.

Rearwardly of each side implement 8, is a guide or supporting wheel 21, carried upon a suitable shaft 22, having its opposite ends journaled in the lower rear corners of the wheel-supporting and housing member 23, which has its upper edges secured to the opposite sides of the handle-bar 15, near the forward end of the latter.

The housing 23, may be of any form desired but is preferably constructed from a blank of sheet material, formed and bent so as to surround and inclose the stock 7ᵃ, said housing having a suitable opening 24 adjacent the under side of the handle-bar 15 to accommodate the beam 7 at the point at which it unites with the stock. The rear edges of the housing 23 are preferably provided with ears 25 which are overlapped and secured together by the rivet 26 to give greater strength to the housing.

It will be understood that the side beams 7 are much farther apart at their rear ends, since they gradually converge from their forward bent portion to their rear ends, than at their central portions or forward ends. It will also be evident that the distance between the rear ends of the side beams 7 may be readily varied by loosening the screws 16 to allow movement of the arms 9, and moving the implements 8 carried by said stocks 7ᵃ toward or away from the implement carried by the central beam 6. The handles 15 may then be readily adjusted and secured in adjusted position by means of the bolts 19.

Owing to the fact that the forward ends 14 of the handles 15 are pivoted to the ears 13 of the plates 11, carried by the side beams 7 it will be evident that by properly applying pressure upon the hand-holds 20 or elevating the same, the implements 8 may be pressed deeper into the ground or raised above their normal positions, as desired.

It will be understood that the wheels 21 rest upon the ground at all times and serve to guide the device and support the same in proper position.

Owing to the pivotal and adjustable connections between the parts, it will be seen that the implements 8 may be caused to move in a straight forward direction with the line of draft or may be turned at an angle thereto; and this feature is of importance when desirable to plow very near to a growing crop, while the draft animals are guided at a safe distance away from the crop. By an inspection of Fig. 1, it will be seen that, although the plate 8 is caused to penetrate more deeper into the soil by raising the handles 20 to a certain limited extent; the portion 23ᵃ of the housing contacts with the stock 7ᵃ and coacts with the pivotal connection 13, for holding the beam and handle bars in rigid relation, while the plow plates are being lifted from contact with the earth, so that the plow may be easily turned, at the ends of the furrows.

Owing to the construction and arrangement of the various parts and the manner in which they are connected it will be evident that should any of the parts become worn or broken they may be readily replaced at a comparatively small cost.

What I claim is:

1. In a plow, beams having implements connected thereto, handle bars pivoted to and extending rearwardly from the beams, wheel housings secured to and depending from the handle bars, and gage wheels mounted in said housings rearwardly of the implements and adapted to coact with the pivotal connection of the handle and beam and housings for raising and lowering the implements.

2. In a plow, a plow beam carrying a downwardly extending stock, a handle bar pivotally connected to the plow beam forwardly of the stock, a plow plate carried by the stock, a housing carried by the handle bar, and a guide wheel mounted in the housing, said housing inclosing the stock and adapted to coact therewith for holding the beam and handle bar in rigid relation while the plow plates are being lifted from the earth.

In testimony whereof I have signed my name to this specification in the presence of two subscribing witnesses.

WILLIAM HENRY WILLIAMS.

Witnesses:
 DAN N. RIGGS,
 H. D. BRAUNLEE.